(12) United States Patent
Kim et al.

(10) Patent No.: US 12,128,803 B2
(45) Date of Patent: Oct. 29, 2024

(54) ARMREST TILTING DEVICE

(71) Applicant: DAS CO., LTD, Gyeongju-si (KR)

(72) Inventors: Seong Hun Kim, Suwon-si (KR); Kwang Su Moon, Hwaseong-si (KR)

(73) Assignee: DAS CO., LTD., Gyeongju-si (KR)

( * ) Notice: Subject to any disclaimer, the term of this patent is extended or adjusted under 35 U.S.C. 154(b) by 115 days.

(21) Appl. No.: 18/153,496

(22) Filed: Jan. 12, 2023

(65) Prior Publication Data

US 2023/0356637 A1  Nov. 9, 2023

(30) Foreign Application Priority Data

May 9, 2022  (KR) .......................... 10-2022-0056789

(51) Int. Cl.
 *B60N 2/75* (2018.01)
 *B60N 2/90* (2018.01)
(52) U.S. Cl.
 CPC ............. *B60N 2/767* (2018.02); *B60N 2/943* (2018.02)
(58) Field of Classification Search
 None
 See application file for complete search history.

(56) References Cited

U.S. PATENT DOCUMENTS

| | | | | |
|---|---|---|---|---|
| 2002/0159824 A1* | 10/2002 | Marquina | .............. | B60N 2/767 403/97 |
| 2010/0327645 A1* | 12/2010 | Jeong | ..................... | B60N 2/859 297/408 |
| 2012/0133189 A1* | 5/2012 | Kobayashi | ............. | B60N 2/767 297/411.38 |

FOREIGN PATENT DOCUMENTS

| | | | |
|---|---|---|---|
| DE | 2525013 A1 | * | 12/1976 |
| KR | 101921910 B1 | | 11/2018 |
| KR | 1020210009251 A | | 1/2021 |
| KR | 1020210125618 A | | 10/2021 |

OTHER PUBLICATIONS

KR Office Action for corresponding KR Application No. 10-2022-0056789, dated Feb. 19. 2024, 6 pgs.

* cited by examiner

*Primary Examiner* — David E Allred
(74) *Attorney, Agent, or Firm* — Tarolli, Sundheim, Covell & Tummino LLP

(57) ABSTRACT

The present disclosure relates to an armrest tilting device provided on a seat and capable of tilting and adjusting an armrest capable of supporting a user's arm. The armrest tilting device includes: a shaft which is installed on a seat and has one end installed on an armrest in such a way as to be relatively rotated; a housing which is fastened to the armrest and supports the shaft in the state where the shaft is installed on the armrest; a bracket which is fastened and fixed to the shaft; a ratchet which is rotatably fastened to a hinge member fastened to the bracket; a sector gear portion which is fastened to and rotates together with the armrest and is engaged with the ratchet; a guide plate which is provided on the sector gear portion and where the ratchet moves in one area while being separated from the sector gear portion; and an elastic member which applies an elastic force such that ratchet gear teeth formed on the ratchet are meshed with sector gear teeth formed on the sector gear portion.

7 Claims, 10 Drawing Sheets

ARMREST TILTING DEVICE

CROSS-REFERENCE TO RELATED APPLICATIONS

The present application claims priority to Korean Patent Application No. 10-2022-0056789, filed May 9, 2022, the entire contents of which is incorporated herein for all purposes by this reference.

BACKGROUND

Field

The present disclosure relates to an armrest tilting device, and more particularly, to an armrest tilting device provided on a seat and capable of tilting and adjusting an armrest capable of supporting a user's arm.

Description of the Related Art

In general, an armrest on which an arm of a passenger is placed in order that the passenger can take a comfortable posture is installed on a seat of a vehicle or train.

The armrest serves to relieve the fatigue of the passenger due to long-term riding, or to prevent the passenger from suddenly leaning to one side when the vehicle suddenly starts, or when the vehicle abruptly turns or suddenly brakes during driving.

The armrest is mounted on both sides or one side of a seatback such that the passengers can put their arms on the armrest. Also, the armrest is exposed from the side of the seatback to the outside and is configured to comfortably support the arm of the passenger.

In addition, the passengers put their arms on the armrest that is horizontal with the indoor floor. When the armrest is not in use, the armrest may be arranged such that the armrest is pivoted in parallel to the backrest of the seat by pivoting the armrest about a shaft provided on one side.

Also, the armrest is configured to adjust an angle at which the arm is supported in accordance with the convenience of the passenger. To this end, a plurality of gears and springs are provided with a complex structure. For this reason, there is a problem that the armrest becomes heavier or bigger.

PRIOR ART DOCUMENT

Patent Document (Patent Document 1) Korean Patent No. 10-1921910 (Oct. 4, 2019)

SUMMARY

Technical Problem

The present invention is designed to solve the above problems, and the purpose of the present invention is to provide an armrest tilting device capable of reducing the number of parts through structural simplification and of having a lighter weight through this.

Technical Solution

One embodiment is an armrest tilting device including: a shaft which is installed on a seat and has one end installed on an armrest in such a way as to be relatively rotated; a housing which is fastened to the armrest, and through which the other end of the shaft passes, and supports the shaft in the state where the shaft is installed on the armrest; a bracket which is fastened and fixed to the shaft; a ratchet which is rotatably fastened to a hinge member fastened to the bracket; a sector gear portion which is fastened to and rotates together with the armrest and is engaged with the ratchet; a guide plate which is provided on the sector gear portion and where the ratchet moves in one area while being separated from the sector gear portion; and an elastic member which is provided between the bracket and the ratchet and applies an elastic force such that ratchet gear teeth formed on the ratchet are meshed with sector gear teeth formed on the sector gear portion.

With this configuration, after the armrest is rotated in one direction and the ratchet is separated from the sector gear portion, when the armrest is rotated in the other direction, the guide plate travels one area while tilting the ratchet in an axial direction. When the ratchet is separated from the guide plate, the ratchet is engaged again with the sector gear portion while returning by the elastic force of the elastic member.

The guide plate includes: a guide plate body which is fastened to the sector gear portion; a guide inclined portion which is formed to be inclined downward at an end of the guide plate body and comes in close contact with the ratchet while the ratchet separated from the sector gear portion is tilted in an axial direction; a guide portion which protrudes from the guide plate body to a side surface of the sector gear teeth and guides a relative movement of the ratchet; and a ratchet insertion portion which is formed to expose a side surface of the sector gear portion such that the ratchet which has relatively moved along the guide portion is inserted and is engaged with the sector gear portion.

One end of the elastic member is fastened to the bracket and the other end is fastened to the ratchet in a state where the elastic member is inserted into the hinge member. The elastic member applies the elastic force in a rotational direction to the ratchet such that the ratchet gear teeth are meshed with the sector gear teeth. The elastic member applies the elastic force in an axial direction such that the ratchet separated from the sector gear portion is engaged with the sector gear portion.

The sector gear portion includes: a sector gear portion body fastened to the armrest; sector gear teeth formed along a side surface of the sector gear portion body such that the ratchet gear teeth are meshed with the sector gear teeth; and a separation inclined portion formed to be inclined downward so as to be spaced apart from the ratchet gear teeth at an end of the side surface of the sector gear portion body.

The ratchet includes: a ratchet body which is rotatably fastened to the hinge member; ratchet gear teeth which are formed on an end portion of the ratchet body and are meshed with the sector gear teeth; and a ratchet inclined portion which is inclined downward toward the end portion where the ratchet gear teeth are formed and is guided to the guide plate in a state of being separated from the sector gear portion.

The shaft includes: a shaft body which passes through a shaft through-hole formed in the housing and is installed on the seat; a flange portion which is radially extended from the shaft body so as to have a larger diameter than that of the shaft through-hole and is in close contact with the housing; a bracket fastener which is formed to protrude from the flange portion in an axial direction and is fitted into a shaft fastening hole of the bracket; and a rotation shaft which is formed to protrude from the fastener in the axial direction, is inserted into a rotation hole formed in the armrest, and then is rotationally supported.

Advantageous Effects

According to the armrest tilting device according to the present invention, it is possible to reduce the number of parts through structural simplification, thereby having a lighter weight.

DETAILED DESCRIPTION

Hereinafter, the preferred embodiment of the present invention will be described in detail with reference to the accompanying drawings.

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

Terms used in the present specification are provided for description of only specific embodiments of the present invention, and not intended to be limiting. An expression of a singular form includes the expression of plural form thereof unless otherwise explicitly mentioned in the context.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Hereinafter, specific embodiments of the present invention will be described with reference to the accompanying drawings.

Figure 1:
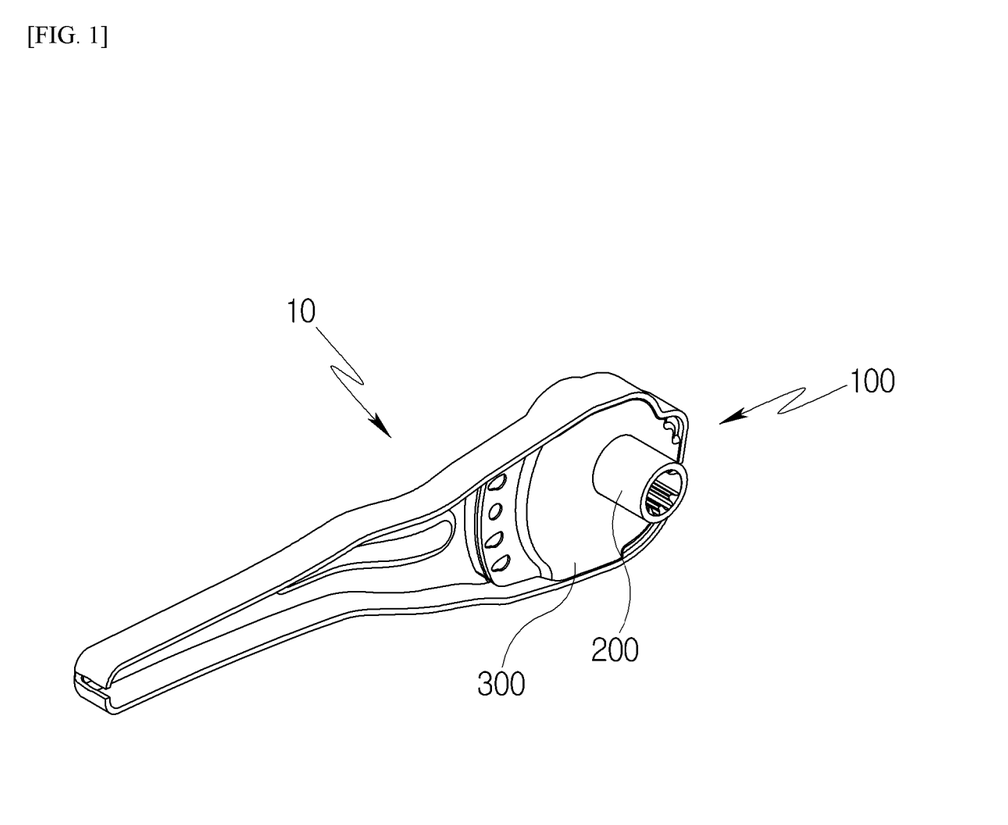
FIG. 1 is a perspective view showing schematically an armrest tilting device according to an embodiment of the present invention.
Figure 2:
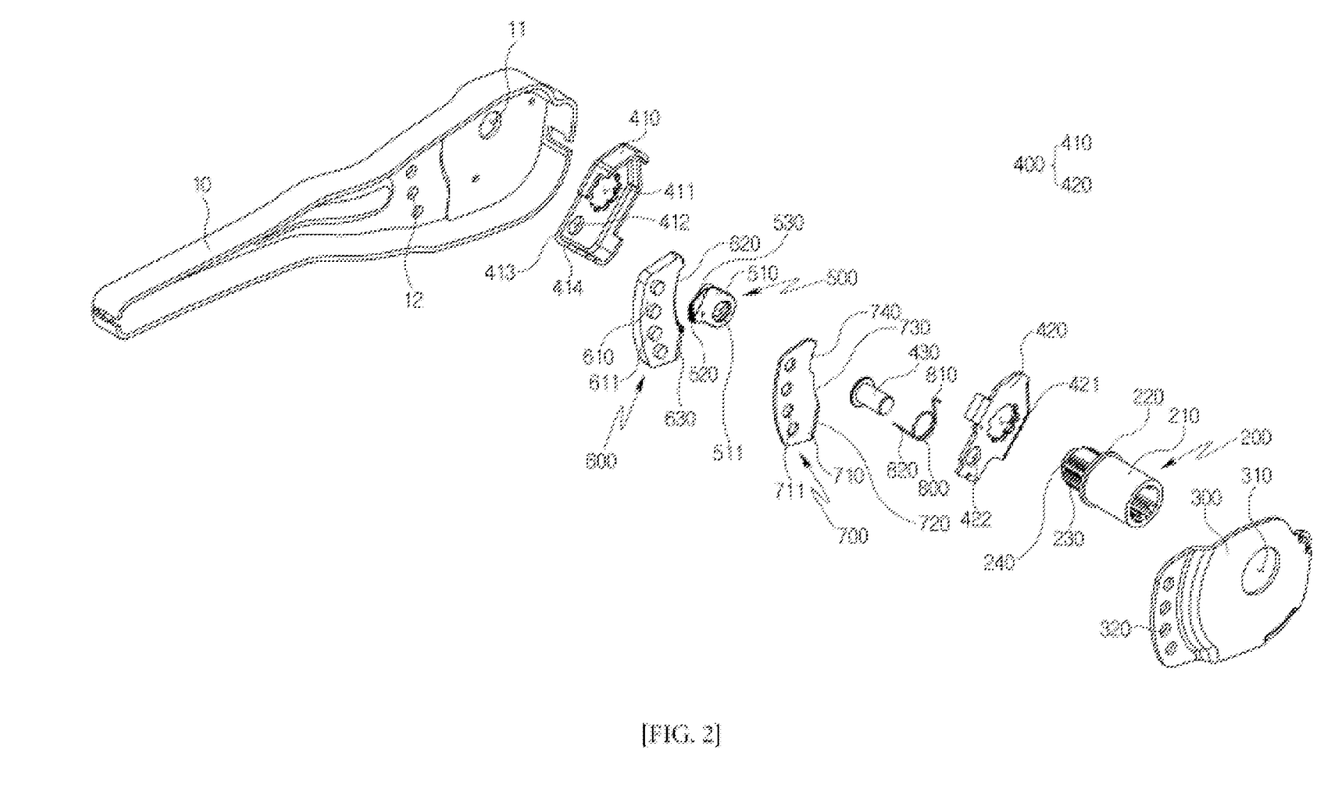
FIG. 2 is an exploded perspective view showing schematically the armrest tilting device according to the embodiment of the present invention.
Figure 3:
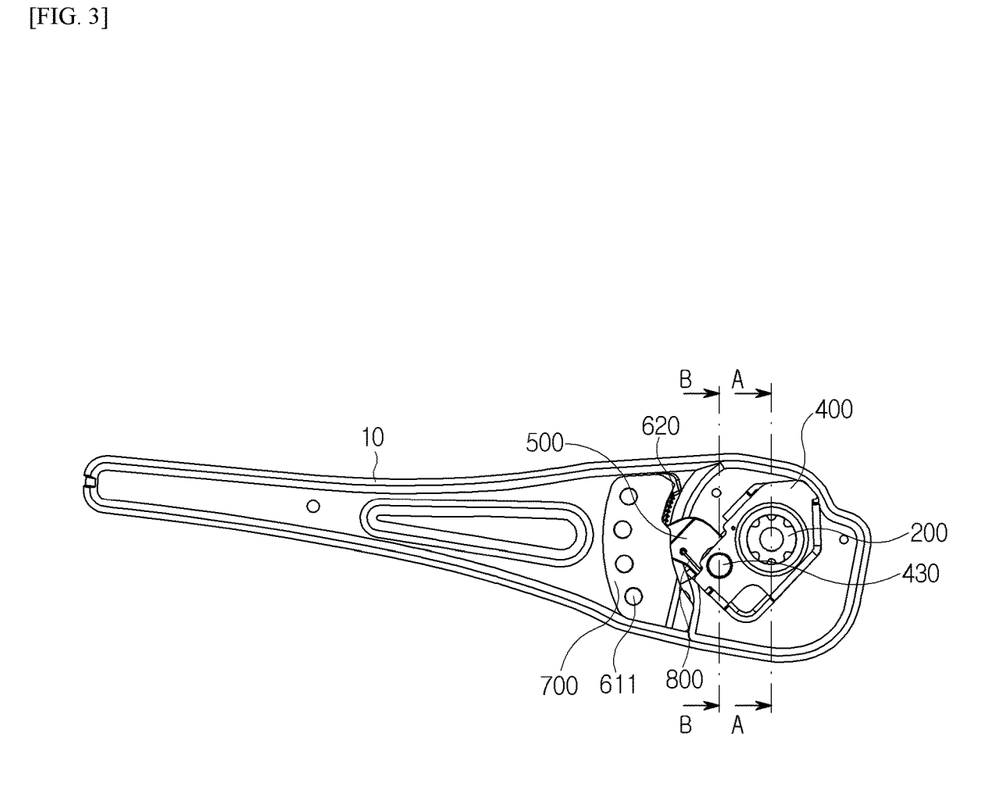
FIG. 3 is a plan view showing schematically the armrest tilting device according to the embodiment of the present invention.
Figure 4:
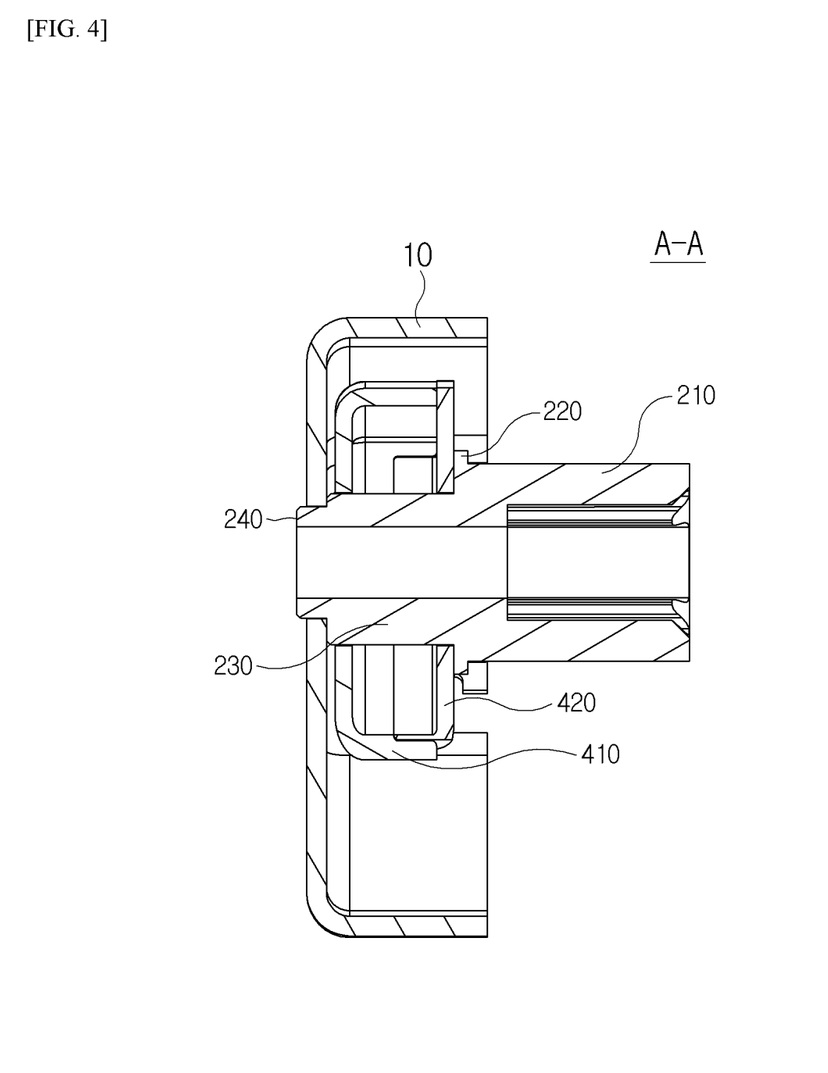
FIG. 4 is a schematic cross sectional view taken along line A-A of FIG. 3 of the armrest tilting device according to the embodiment of the present invention.
Figure 5:
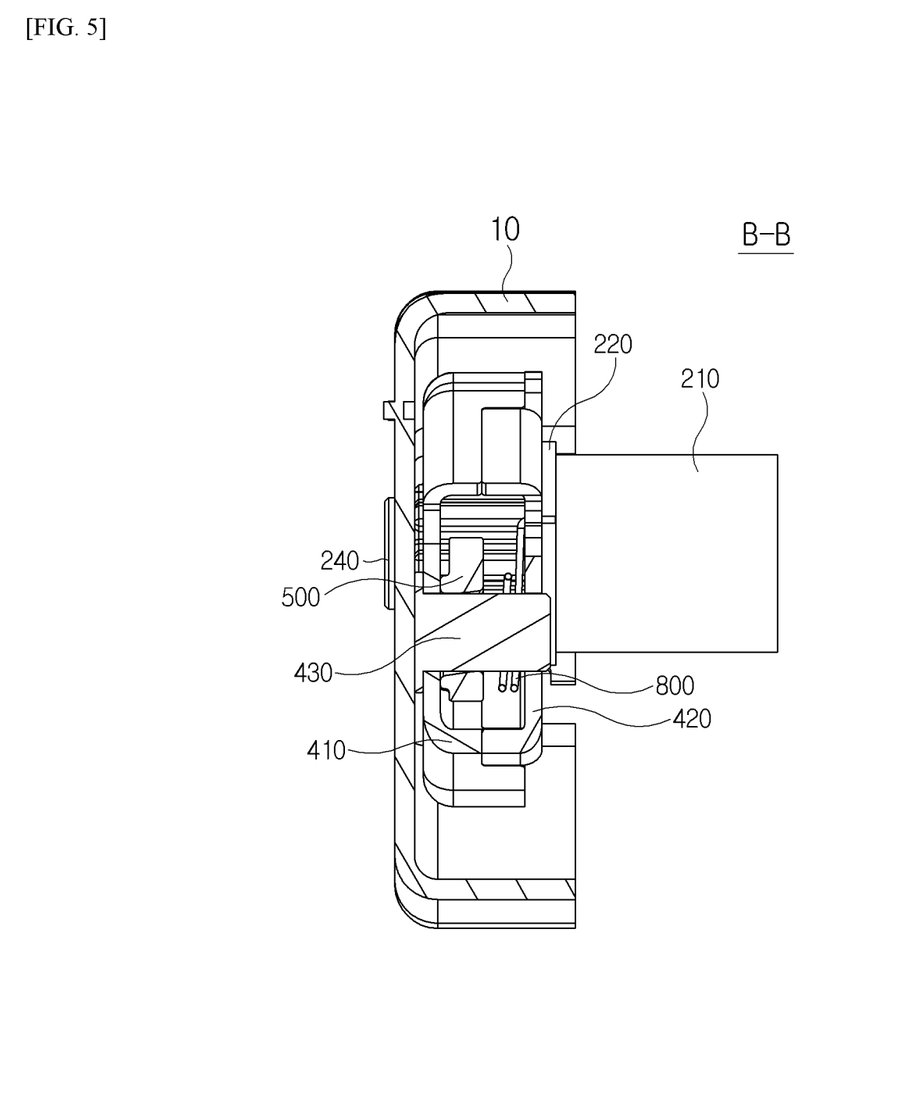
FIG. 5 is a schematic cross sectional view taken along line B-B of FIG. 3 of the armrest tilting device according to the embodiment of the present invention.
Figure 6:
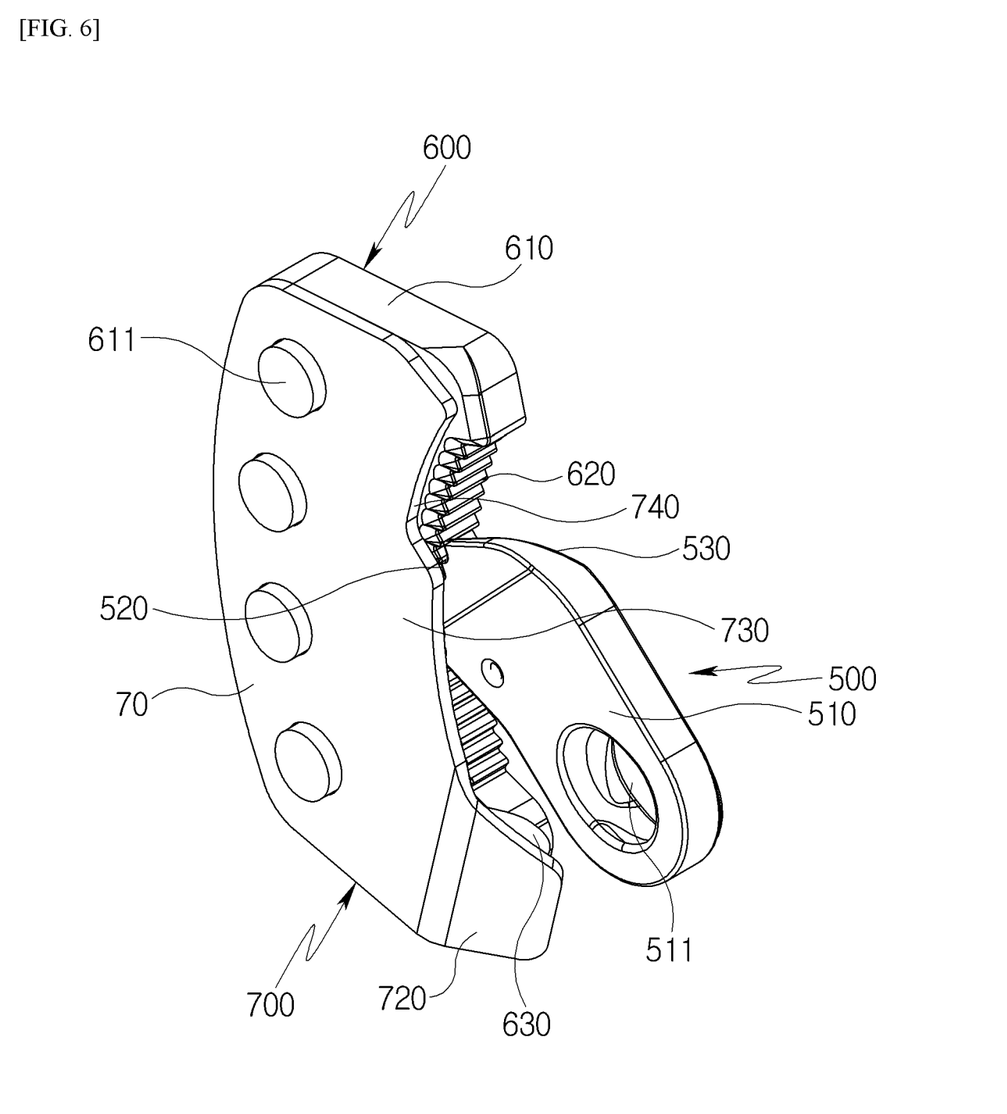
FIG. 6 is a perspective view showing schematically a main part of the armrest tilting device according to the embodiment of the present invention.
Figure 7:
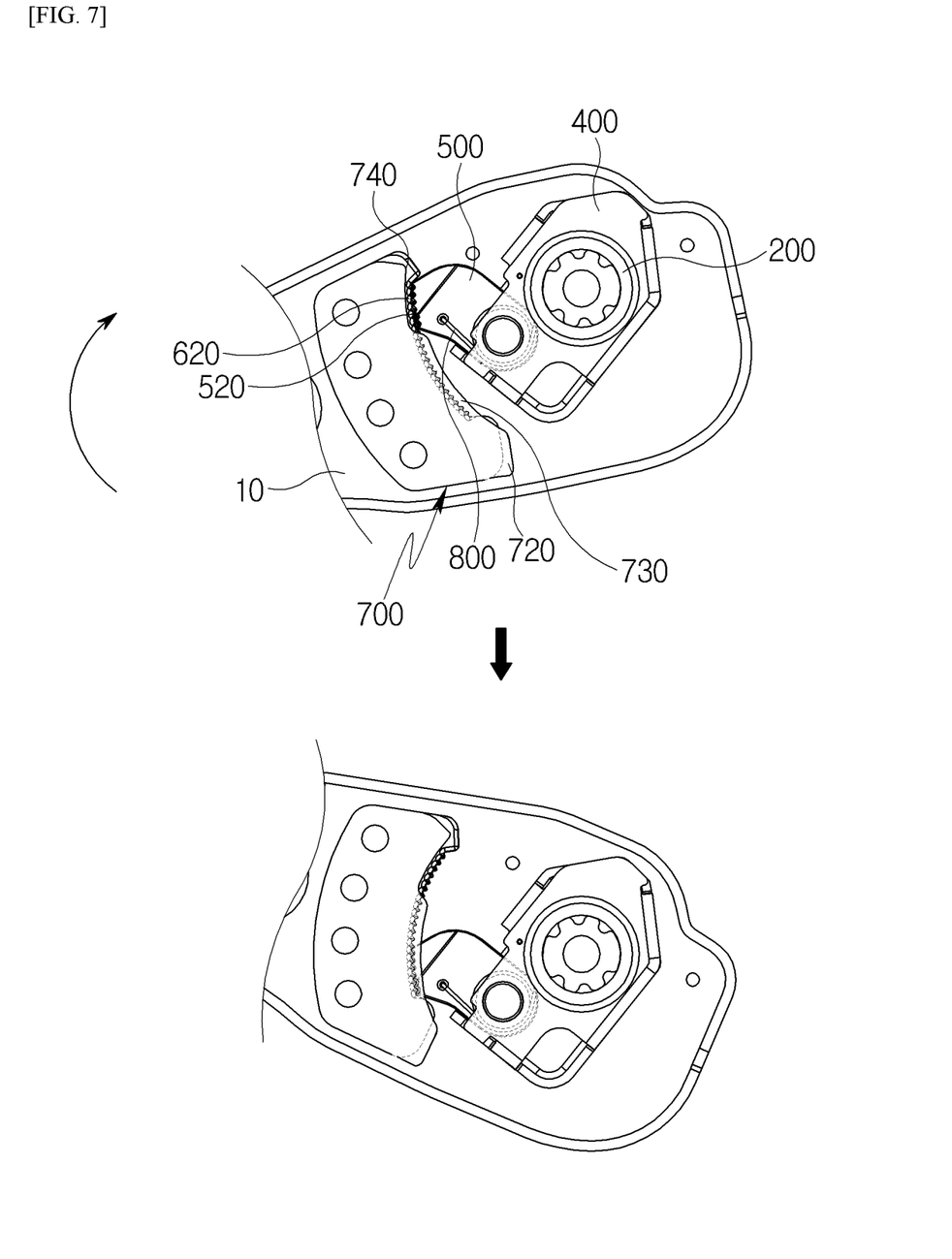
FIG. 7 shows schematically a state where the armrest is tilted in the armrest tilting device according to the embodiment of the present invention.
Figure 8:
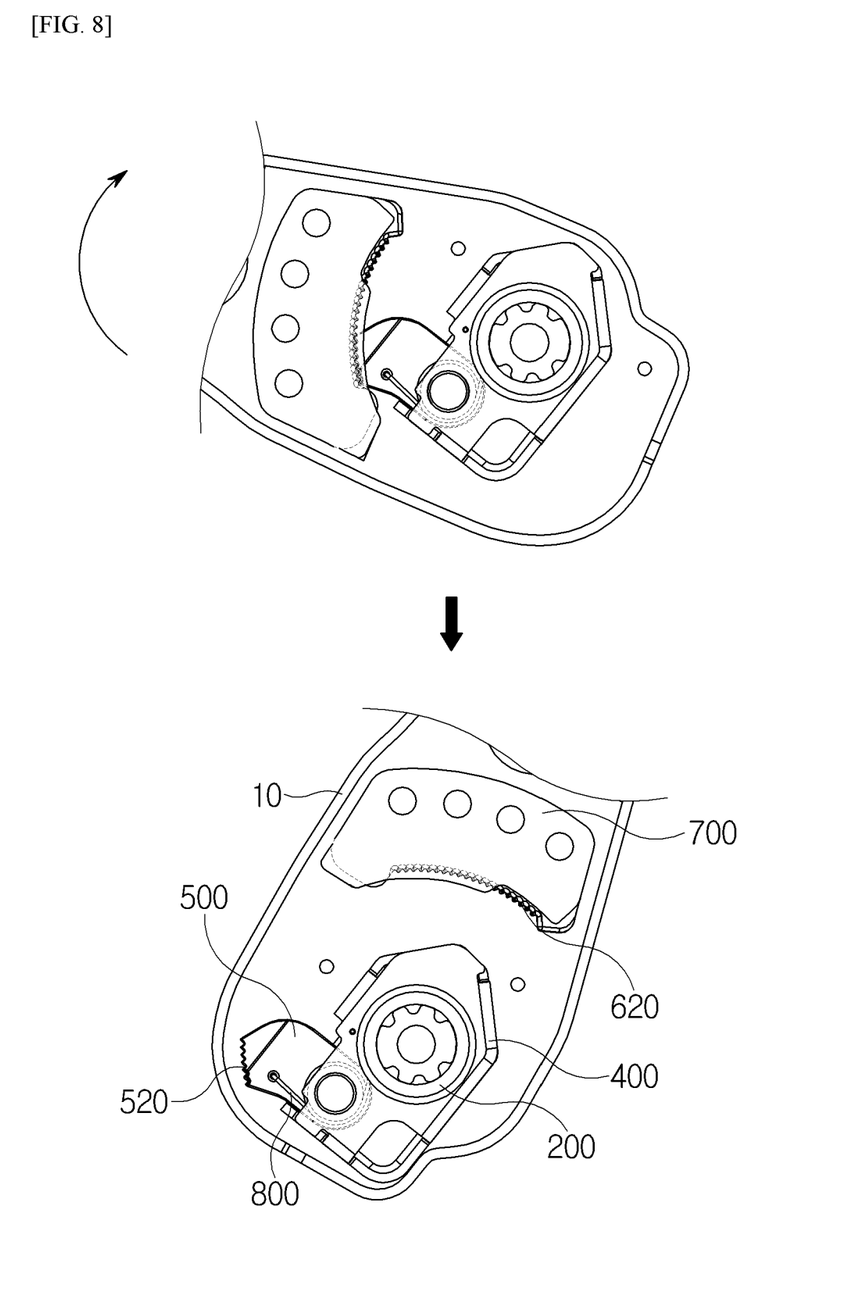
FIG. 8 shows schematically a state where a ratchet is separated from a sector gear portion in the armrest tilting device according to the embodiment of the present invention.
Figure 9:
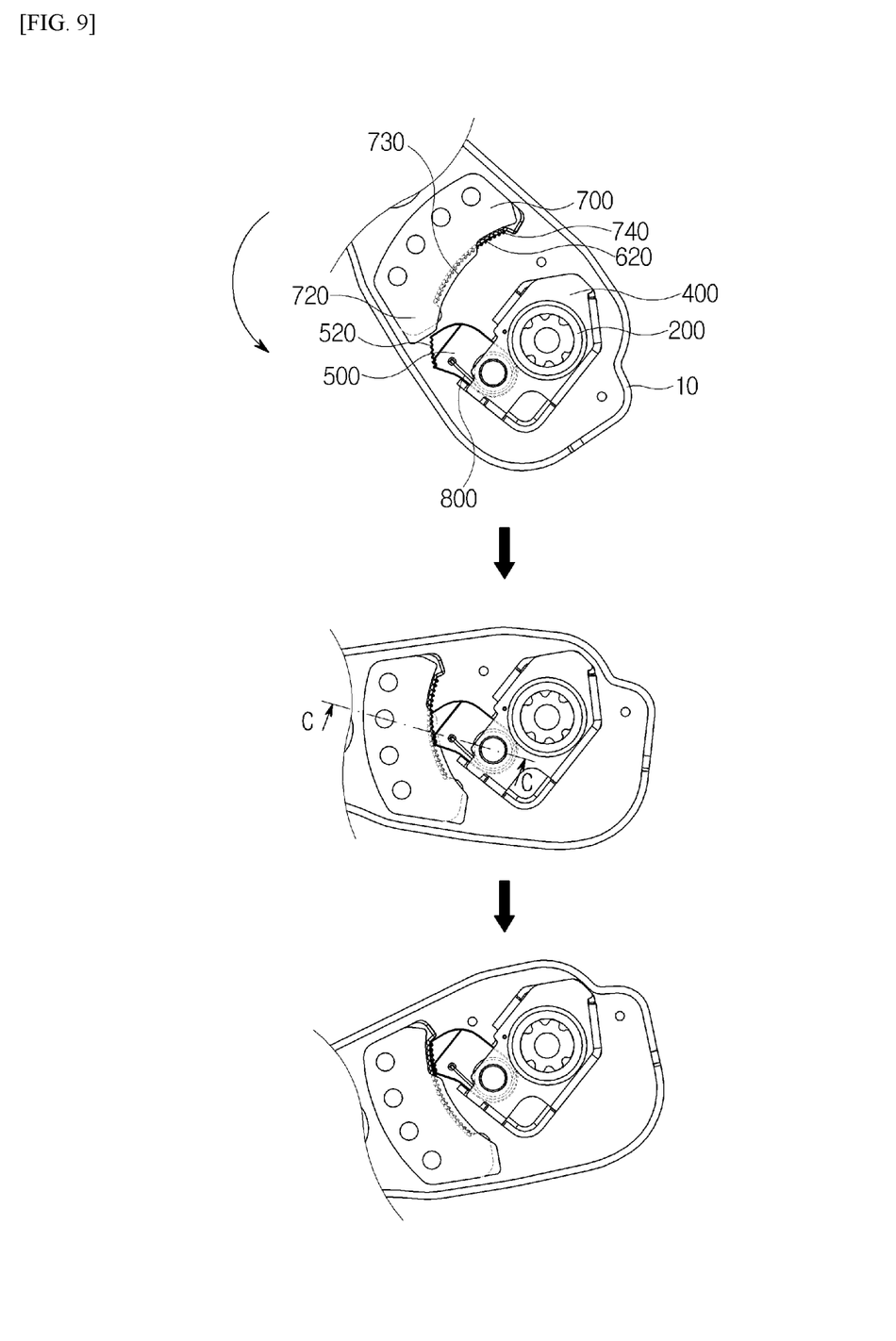
FIG. 9 shows schematically a state where the ratchet moves along a guide plate and then is again meshed with the sector gear portion in the armrest tilting device according to the embodiment of the present invention.
Figure 10:
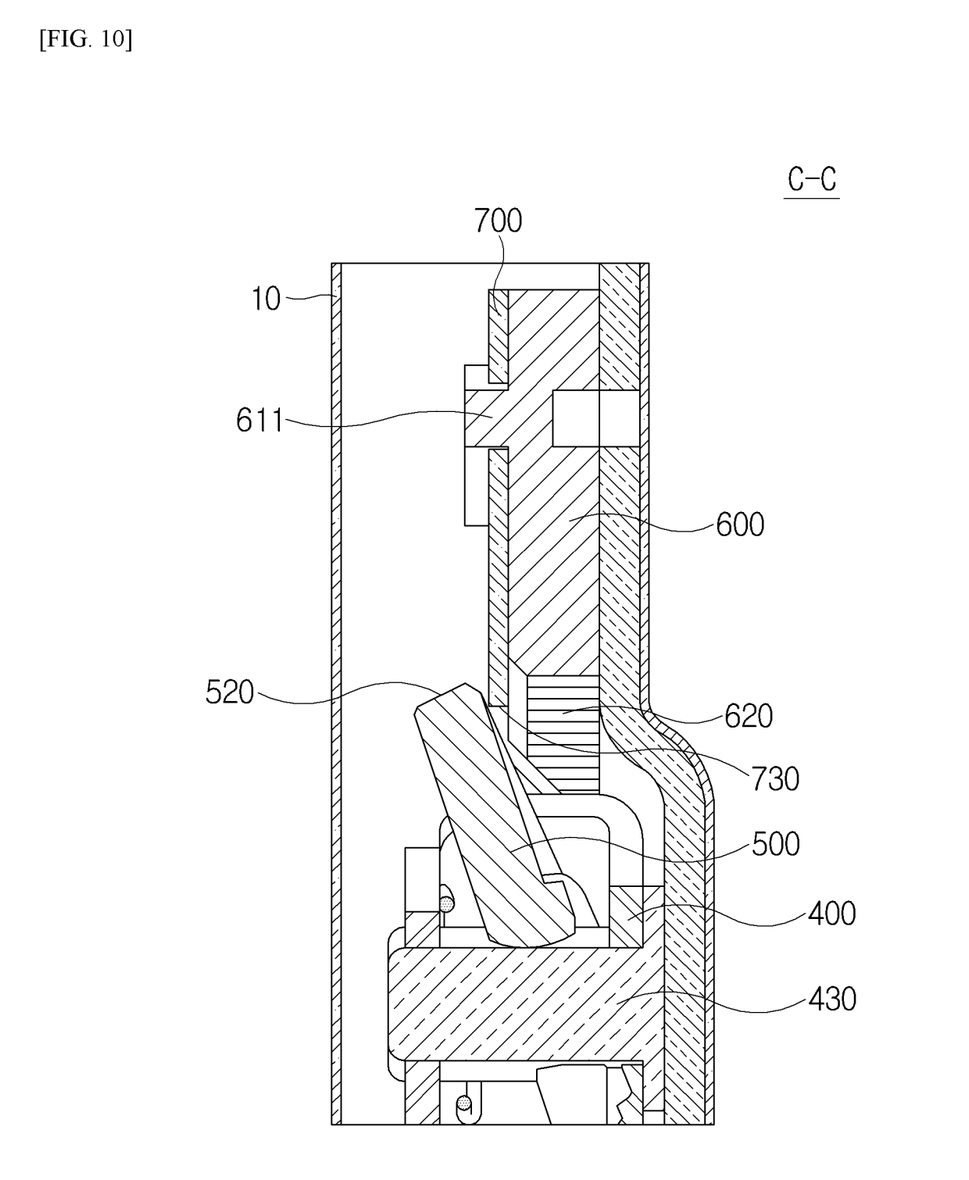
FIG. 10 is a schematic cross sectional view taken along line C-C of FIG. 9 of the armrest tilting device according to the embodiment of the present invention.

FIGS. 1 and 2 are a perspective view and an exploded perspective view showing schematically an armrest tilting device according to an embodiment of the present invention. FIG. 3 is a plan view showing schematically the armrest tilting device according to the embodiment of the present invention. FIGS. 4 and 5 are schematic cross sectional views taken along lines A-A and B-B of FIG. 3 respectively. FIG. 6 is a perspective view showing schematically a main part of the armrest tilting device according to the embodiment of the present invention. FIGS. 7 to 9 show schematically states where the armrest tilting device is operated. FIG. 10 is a schematic cross sectional view taken along line C-C of FIG. 9.

Referring to FIGS. 1 to 10, the armrest tilting device 100 according to the embodiment of the present invention includes a shaft 200 installed on a seat (not shown), a housing 300 in which the shaft 200 is rotatably installed on an armrest 10, a bracket 400 fastened and fixed to the shaft 200, a ratchet 500 rotatably fastened to the bracket 400, a sector gear portion 600 fastened to the armrest 10 and engaged with the ratchet 500, a guide plate 700 which guides the ratchet 500 separated from the sector gear portion 600 to move while being separated, and an elastic member 800 which applies an elastic force such that the ratchet 500 is engaged with the sector gear portion 600.

In particular, in the armrest tilting device 100 of the present invention, after the armrest 10 is rotated in one direction and the ratchet 500 is separated from the sector gear portion 600, when the armrest 10 is rotated in the other direction, the guide plate 700 travels one area in a state where the ratchet 500 is in close contact with the guide plate 700 while being tilted in an axial direction by the guide plate 700, that is, in the state where the ratchet 500 is separated from the sector gear portion 600. When the ratchet 500 is separated from the guide plate 700, the ratchet 500 is engaged again with the sector gear portion 600 while returning by the elastic force of the elastic member 800.

That is, when the armrest 10 is rotated within a range of a certain angle in an upward direction, that is, in one direction from a basic position where the armrest 10 is capable of supporting the arm, the state in which the ratchet 500 is engaged with the sector gear portion 600 is maintained, and thus, the armrest 10 can be used in a state where the armrest 10 is tilted at an angle desired by a user.

In this state, if it is necessary to change the tilted angle of the armrest 10 again from the beginning, the armrest 10 is rotated in the upward direction until the armrest stands almost upright, and then the armrest is rotated again in the other direction, that is, in a downward direction. Accordingly, the angle can be adjusted by tilting the armrest 10 again from its initial position.

Here, when the armrest 10 is rotated in the upward direction, the ratchet 500 is separated from the sector gear portion 600, and when the armrest 10 is rotated in the downward direction, the guide plate 700 tilts the ratchet 500 in the axial direction, and then the guide plate 700 moves in the state where the ratchet 500 is separated from the sector gear portion 600. When the armrest 10 reaches the initial position, the ratchet 500 is separated from the guide plate 700 by the elastic force of the elastic member 800 and is engaged again with the sector gear part 600.

That is, the elastic member 800 applies an elastic force in the rotational direction such that the ratchet 500 is engaged with the sector gear part 600 in an area where the ratchet 500 is located in the sector gear part 600. When the ratchet 500 is positioned on the guide plate 700, the elastic member 800 applies the elastic force in the axial direction, so that when the ratchet 500 is separated from the guide plate 700, the ratchet 500 is engaged again with the sector gear portion 600 while returning.

For this operation, the armrest 10 is rotatably installed on the seat through the shaft 200.

In addition, one end of the shaft 200 is installed on the armrest 10 in such a way as to be relatively rotated and is fixed to the armrest 10 in a rotation state by the housing 300.

More specifically, the shaft 200 includes a shaft body 210 which passes through a shaft through-hole 310 formed in the housing 300 and is installed on the seat, a flange portion 220 which is radially extended from the shaft body 210 so as to have a larger diameter than that of the shaft through-hole 310 and is in close contact with the housing 300, a bracket fastener 230 which is formed to protrude from the flange portion 220 in the axial direction and is fitted into shaft fastening holes 411 and 421 formed in the bracket 400, and a rotation shaft 240 which is formed to protrude from the bracket fastener 230 in the axial direction, is inserted into a rotation hole 11 formed in the armrest 10, and then is rotationally supported.

That is, in the shaft 200, the rotation shaft 240 is rotatably inserted into the rotation hole 11 of the armrest 10, and the housing 300 is fastened to the armrest 10. Thus, and the shaft body 210 protrudes to the outside of the housing 300 through the shaft through-hole 310 of the housing 300, and the flange portion 220 is in close contact with the inner surface of the housing 300, so that the armrest 10 is rotatably installed on the shaft 200.

The bracket 400 is inserted and fastened to the bracket fastener 230 of the shaft 200, and is fastened and fixed to the shaft 200.

For example, the bracket 400 may include a bracket body 410 and a bracket cover 420 coupled to the bracket body 410.

The bracket body 410 includes the shaft fastening hole 411 and a hinge member fastening hole 412. The shaft fastening hole 411 is disposed on the inner peripheral surface of the armrest 10. The bracket fastener 230 of the shaft 200 is inserted and fastened to the shaft fastening hole 411. A hinge member 430 to which the ratchet 500 is rotatably fastened is inserted through the hinge member fastening hole 412.

In addition, the bracket body 410 includes a ratchet insertion groove 413 and a ratchet stopper 414. The ratchet 500 is disposed in the ratchet insertion groove 413. The ratchet stopper 414 is formed adjacent to the ratchet insertion groove 413. The ratchet 500 is in close contact with the ratchet stopper 414, and the ratchet stopper 414 restricts the rotation.

The ratchet 500 is disposed to be rotated in one direction by the rotational elastic force of the elastic member 800, and the ratchet 500 is restricted by the ratchet stopper 414, and thus, is prevented from rotating over a certain range. That is, in the state where the ratchet 500 is disposed in close contact with the ratchet stopper 414 by the elastic force of the elastic member 800, ratchet gear teeth 520 are meshed with sector gear teeth 620.

The bracket cover 420 is disposed in close contact with the flange portion 220 of the shaft 200 and is fastened to the bracket body 410 in the state where the ratchet 500 is inserted into the hinge member 430, so that the ratchet 500 is prevented from being separated in the axial direction. The bracket cover 420 includes the shaft fastening hole 421 and a hinge member fastening hole 422. The bracket fastener 230 of the shaft 200 is inserted and fastened to the shaft fastening hole 421. The hinge member 430 is inserted through the hinge member fastening hole 422.

Here, unevenness is formed along the periphery of the shaft fastening holes 411 and 421, and unevenness having a shape corresponding to that of the unevenness is also formed on the outer peripheral surface of the bracket fastener 230 of the shaft 200. Accordingly, the bracket 400 is fastened and fixed to the shaft 200 in such a way as not to relatively rotate.

The ratchet 500 is inserted into the hinge member 430 fastened to the bracket 400 and rotatably fastened, and the ratchet gear teeth 520 are meshed with the sector gear teeth 620 by the elastic force of the elastic member 800.

More specifically, the ratchet 500 includes a ratchet body 510 which has a hinge member insertion hole 511 formed to allow the hinge member 430 to be inserted thereinto and is inserted and rotatably fastened to the hinge member, the ratchet gear teeth 520 which are formed on the end portion of the ratchet body 510 and are meshed with the sector gear teeth 620, and a ratchet inclined portion 530 which is inclined downward toward the end portion where the ratchet gear teeth 520 are formed and is guided to the guide plate 700 in the state of being separated from the sector gear portion 600.

With this configuration, in a state in which the ratchet 500 is disposed to face the sector gear portion 600, the ratchet gear teeth 520 are meshed with the sector gear teeth 620 by the elastic force of the elastic member 800. In addition, when the armrest 10 rotates upward and the ratchet 500 is separated from the sector gear portion 600 and then the armrest 10 rotates downward, the ratchet inclined unit 530 is supported by the guide plate 700 while being tilted along a guide inclined portion 720 of the guide plate 700, so that the ratchet 500 is separated from the sector gear portion 600. Also, when the armrest 10 returns to the initial position, the ratchet 500 is separated from the guide plate 700 by the elastic force of the elastic member 800, and the ratchet gear teeth 520 are again meshed with the sector gear teeth 620.

The sector gear portion 600 is fastened to the armrest 10 and rotates together with the armrest 10. The ratchet 500 is engaged with the sector gear portion 600.

More specifically, the sector gear portion 600 includes a sector gear portion body 610 fastened to the armrest 10, the sector gear teeth 620 formed along the side surface of the sector gear portion body 610 such that the ratchet gear teeth 520 are meshed with the sector gear teeth 620, a separation inclined portion 630 formed to be inclined downward so as to be spaced apart from the ratchet gear teeth 520 at the end of the side surface of the sector gear portion body 610.

The sector gear portion body 610 has a plurality of fastening protrusions 611 formed outward from both sides thereof. The fastening protrusions protruding toward the armrest 10 are inserted and fastened to fastening grooves 12 formed on the inner peripheral surface of the armrest 10. In addition, as the plurality of fastening protrusions 611 protruding from the sector gear portion body 610 toward the housing 300 side are inserted into fastening protrusion fastening holes 320 formed in the housing 300, the housing 300 is fastened.

Also, referring to FIG. 7, the sector gear teeth 620 are formed to have a longer area than that of the ratchet gear teeth 520. The tilting angle of the armrest 10 may be adjusted in an area where the ratchet gear teeth 520 are meshed with the sector gear teeth 620.

The guide plate 700 is provided on the sector gear portion 600, and the ratchet 500 moves in one area while being separated from the sector gear portion 600.

That is, during the process in which the armrest 10 returns to the initial position, the guide plate 700 supports the ratchet 500 in a state where the ratchet 500 is separated without being engaged with the sector gear portion 600. Then, when the armrest 10 returns to the initial position, the guide plate 700 guides the ratchet 500 to be engaged again with the sector gear portion 600.

More specifically, the guide plate 700 includes a guide plate body 710 in which a plurality of fastening protrusion through-holes 711 is formed such that the fastening protrusion 611 formed in the sector gear portion 600 is inserted and fastened to the fastening protrusion through-hole 711, a guide inclined portion 720 which is formed to be inclined downward at the end of the guide plate body 710 and comes in close contact with the ratchet while the ratchet 500 separated from the sector gear portion 600 is tilted in the axial direction, a guide portion 730 which protrudes from the guide plate body 710 to the side surface of the sector gear teeth 620 and guides the relative movement of the ratchet 500, and a ratchet insertion portion 740 formed to expose a side surface of the sector gear portion 600 such that the ratchet 500 which has relatively moved along the guide portion 730 is inserted and is engaged with the sector gear portion 600.

With this configuration, when the armrest 10 rotates upward and the ratchet 500 is, as shown in FIG. 8, separated from the sector gear portion 600 and then the armrest 10 rotates downward as shown in FIG. 9, the ratchet 500 relatively moves to the guide portion 730 along the guide inclined portion 720 as the ratchet inclined portion 530 comes in contact with the guide inclined portion 720. When the armrest 10 continues to rotate downward, the ratchet 500 relatively moves along the guide portion 730. Then, as the ratchet 500 is inserted into the ratchet insertion portion 740 by the elastic force of the elastic member 800 at the position of the ratchet insertion portion 740, the ratchet gear teeth 520 are again meshed with the sector gear teeth 620.

In the state in which the elastic member 800 is inserted into the hinge member 430, one end 810 is fastened to the bracket 400 and the other end 820 is fastened to the ratchet 500. With this configuration, the elastic member 800 applies the elastic force in the rotational direction to the ratchet 500 such that the ratchet gear teeth 520 are meshed with the sector gear teeth 620. Then, the elastic member 800 further applies the elastic force in the axial direction to the ratchet 500 which is tilted after being separated from the sector gear portion 600 and is supported by the guide plate 700. When the ratchet 500 is positioned in the ratchet insertion portion 740 formed on the guide plate 700, the elastic member 800 applies the elastic force such that the ratchet gear teeth 520 are engaged again with the sector gear portion 600.

Although the present invention has been described above by way of the specific embodiments, this is for describing the present invention in detail. The present invention is not limited thereto and it is clear that the present invention can be modified or improved within the spirit of the present invention by those of ordinary skill in the art.

All simple modifications or changes of the present invention fall within the scope of the present invention. The specific scope of protection of the present invention will be apparent by the appended claims.

| REFERENCE NUMERALS | |
|---|---|
| 10: Armrest | 100: Armrest Tilting Device |
| 200: Shaft | 210: Shaft Body |
| 220: Flange Portion | 230: Bracket Fastener |
| 240: Rotation Shaft | 300: Housing |
| 310: Shaft Through-Hole | 320: Fastening Protrusion Fastening Hole |
| 400: Bracket | 410: Bracket Body |
| 420: Bracket Cover | 430: Hinge Member |
| 500: Ratchet | 510: Ratchet Body |
| 520: Ratchet Gear Teeth | 530: Ratchet Inclined Portion |
| 600: Sector Gear Portion | 610: Sector Gear Portion Body |
| 620: Sector Gear Teeth | 630: Separation Inclined Portion |
| 700: Guide Plate | 710: Guide Plate Body |
| 720: Guide Inclined Portion | 730: Guide Portion |
| 740: Ratchet Insertion Portion | 800: Elastic Member |

What is claimed is:

1. A armrest tilting device comprising:
a shaft which is installed on a seat and has one end installed on an armrest in such a way as to be relatively rotated;
a housing which is fastened to the armrest, and through which the other end of the shaft passes, and the housing supported on the shaft in the state where the shaft is installed in the armrest;
a bracket which is fastened and fixed to the shaft;
a ratchet which is rotatably fastened to a hinge member fastened to the bracket;
a sector gear portion which is fastened to and rotates together with the armrest and is engaged with the ratchet when the armrest is initially rotated in one direction;
a guide plate which is provided on the sector gear portion and where the sector gear portion and the guide plate move beyond and are separated from the ratchet during continued rotation in the one direction; and
an elastic member which is provided between the bracket and the ratchet and applies an elastic force such that ratchet gear teeth formed on the ratchet are meshed with sector gear teeth formed on the sector gear portion during at least a portion of rotation in the one direction;
wherein, after the armrest is rotated in the one direction and the ratchet is separated from the sector gear portion and the guide plate, when the armrest is rotated in the other direction, the guide plate travels with the sector gear portion and tilts the ratchet in an axial direction away from the sector gear portion.

2. The armrest tilting device of claim 1,
wherein, after rotation of the armrest in the other direction in which the ratchet is separated from the guide plate, the ratchet is engaged again with the sector gear portion by the elastic force of the elastic member.

3. The armrest tilting device of claim 1, wherein the guide plate comprises:
a guide plate body which is fastened to the sector gear portion;
a guide inclined portion which is formed to be inclined downward at an end of the guide plate body and comes in close contact with the ratchet while the ratchet separates from the sector gear portion and is tilted in an axial direction;
a guide portion which protrudes from the guide plate body to a side surface of the sector gear teeth and guides a relative movement of the ratchet; and a ratchet insertion portion which is formed to expose a side surface of the sector gear portion such that the ratchet which has relatively moved along the guide portion is inserted and is engaged with the sector gear portion.

4. The armrest tilting device of claim 1,
wherein one end of the elastic member is fastened to the bracket and the other end is fastened to the ratchet in a state where the elastic member is inserted into the hinge member,
wherein the elastic member applies the elastic force in a rotational direction to the ratchet such that the ratchet gear teeth are meshed with the sector gear teeth,
and wherein the elastic member applies the elastic force in an axial direction such that the ratchet separated from the sector gear portion is engaged with the sector gear portion.

5. The armrest tilting device of claim 1, wherein the sector gear portion comprises:
a sector gear portion body fastened to the armrest;
sector gear teeth formed along a side surface of the sector gear portion body such that the ratchet gear teeth are meshed with the sector gear teeth; and
a separation inclined portion formed to be inclined downward so as to be spaced apart from the ratchet gear teeth at an end of the side surface of the sector gear portion body.

6. The armrest tilting device of claim 1, wherein the ratchet comprises:
a ratchet body which is rotatably fastened to the hinge member;
ratchet gear teeth which are formed on an end portion of the ratchet body and are meshed with the sector gear teeth; and
a ratchet inclined portion which is inclined downward toward the end portion where the ratchet gear teeth are formed and is guided to the guide plate in a state of being separated from the sector gear portion.

7. The armrest tilting device of claim 1, wherein the shaft comprises:
a shaft body which passes through a shaft through-hole formed in the housing and is installed on the seat;
a flange portion which is radially extended from the shaft body so as to have a larger diameter than that of the shaft through-hole and is in close contact with the housing;
a bracket fastener which is formed to protrude from the flange portion in an axial direction and is fitted into a shaft fastening hole of the bracket; and
a rotation shaft which is formed to protrude from the fastener in the axial direction, is inserted into a rotation hole formed in the armrest, such that the armrest is rotationally supported.

* * * * *